United States Patent
Agrawal et al.

(10) Patent No.: US 12,417,480 B2
(45) Date of Patent: Sep. 16, 2025

(54) PERSONALIZED PRODUCT RECOMMENDATIONS BASED ON AN ITINERARY

(71) Applicant: Motorola Mobility LLC, Chicago, IL (US)

(72) Inventors: Amit Kumar Agrawal, Bangalore (IN); Srikanth Raju, Sahakaranagar (IN); Renuka Prasad Herur Rajashekaraiah, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 94 days.

(21) Appl. No.: 17/957,996

(22) Filed: Sep. 30, 2022

(65) Prior Publication Data
US 2024/0112241 A1  Apr. 4, 2024

(51) Int. Cl.
G06Q 30/0601   (2023.01)
G06Q 10/02     (2012.01)
G06Q 50/14     (2012.01)

(52) U.S. Cl.
CPC ..... *G06Q 30/0631* (2013.01); *G06Q 30/0625* (2013.01); *G06Q 30/0643* (2013.01); *G06Q 10/02* (2013.01); *G06Q 50/14* (2013.01)

(58) Field of Classification Search
CPC ....... G06Q 10/02–025; G06Q 30/0205; G06Q 30/0207; G06Q 30/0251–0277;
(Continued)

(56) References Cited

U.S. PATENT DOCUMENTS 10,270,962 B1   4/2019  Stout
10,440,169 B1*  10/2019 Gordon ............... G06F 3/04886
(Continued)

FOREIGN PATENT DOCUMENTS

CN   105320514 A    2/2016
CN   105320514 A1   2/2016
(Continued)

OTHER PUBLICATIONS

Web crawling of social media and related web platforms to analyze backyard poultry owners responses to the 2018-2020 Newcastle Disease (ND) outbreak in Southern California. Jan. 2, 2022. https://ucanr.edu/sites/poultry/files/365447.pdf (Year: 2022).*
(Continued)

*Primary Examiner* — William J Allen
(74) *Attorney, Agent, or Firm* — FIG. 1 Patents

(57) ABSTRACT

Techniques for personalized product recommendations based on an itinerary are described and are implementable to generate a recommendation for a good and/or service based on product data associated with a destination. The described implementations, for instance, enable generation of a recommendation for a user to acquire the good and/or service prior to visiting the destination based on digital content associated with the destination. The described implementations further enable generation of synthetic digital content that depicts the user at the destination with the good and/or service. Additionally, the techniques described herein include a monitoring system that is operable to detect a development related to the destination, and generate an updated recommendation based on the development.

20 Claims, 10 Drawing Sheets

(58) Field of Classification Search
CPC ..... G06Q 30/0601–0645; G06Q 50/14; G06Q 50/26; G06Q 50/265; H04W 4/02; H04W 4/021; H04W 4/024–029; H04W 4/23; G01C 21/3605; G01C 21/3614; G01C 21/3617; G01C 21/3641; G01C 21/3644; G01C 21/3679; G01C 21/3691

See application file for complete search history.

(56) References Cited

U.S. PATENT DOCUMENTS

| | | | |
|---|---|---|---|
| 10,460,464 B1 * | 10/2019 | Hasan | G06T 7/62 |
| 10,803,726 B2 | 10/2020 | Agrawal et al. | |
| 11,443,553 B1 | 9/2022 | Liu et al. | |
| 12,190,408 B2 | 1/2025 | Agrawal et al. | |
| 2002/0107895 A1 | 8/2002 | Timmer | |
| 2012/0159337 A1 | 6/2012 | Travilla et al. | |
| 2012/0221418 A1 * | 8/2012 | Smith | G06Q 30/02 |
| | | | 705/14.67 |
| 2013/0339341 A1 * | 12/2013 | Fan | G06Q 10/02 |
| | | | 707/E17.014 |
| 2014/0130076 A1 | 5/2014 | Moore et al. | |
| 2014/0160019 A1 | 6/2014 | Anda et al. | |
| 2014/0184841 A1 | 7/2014 | Woo et al. | |
| 2015/0055086 A1 | 2/2015 | Fonte et al. | |
| 2015/0186977 A1 | 7/2015 | Leonard et al. | |
| 2015/0296134 A1 | 10/2015 | Cudak et al. | |
| 2016/0142626 A1 | 5/2016 | Bostick et al. | |
| 2017/0004567 A1 | 1/2017 | Dutt et al. | |
| 2018/0032818 A1 | 2/2018 | Abraham et al. | |
| 2018/0211308 A1 | 7/2018 | Cheeks | |
| 2019/0102060 A1 | 4/2019 | Ishida | |
| 2020/0090388 A1 | 3/2020 | Kamoda et al. | |
| 2020/0302510 A1 | 9/2020 | Chachek et al. | |
| 2021/0248365 A1 | 8/2021 | Naderan et al. | |
| 2022/0254279 A1 | 8/2022 | Oonishi et al. | |
| 2022/0313077 A1 | 10/2022 | Singh et al. | |
| 2024/0111820 A1 | 4/2024 | Agrawal | |
| 2024/0112240 A1 | 4/2024 | Agrawal | |

FOREIGN PATENT DOCUMENTS

| | | |
|---|---|---|
| EP | 3139590 A1 | 3/2017 |
| WO | 2017114581 A1 | 7/2017 |

OTHER PUBLICATIONS

Travel Bans Rescinded, Replaced With Vaccine Requirement. Oct. 2021. https://www.mvalaw.com/alert-10265 (Year: 2021).*

U.S. Appl. No. 17/957,455, "Non-Final Office Action", U.S. Appl. No. 17/957,455, Apr. 26, 2024, 38 pages.

U.S. Appl. No. 17/957,903, "Non-Final Office Action", U.S. Appl. No. 17/957,903, Feb. 23, 2024, 27 pages.

Chen, Yan-Ying, et al., "Travel Recommendation by Mining People Attributes and Travel Group Types From Community-Contributed Photos", IEEE Transactions on Multimedia, vol. 15, No. 6, May 29, 2013, 13 pages.

Figueredo, Mickael, et al., "From Photos to Travel Itinerary: a Tourism Recommender System for Smart Tourism Destination", 2018 IEEE Fourth International Conference on Big Data Computing Service and Applications (BigDataService), Mar. 2018, 8 pages.

Septiningrum, Lutfia, et al., "Tourism Itinerary Design: User Experience Approach", 2022 International Conference Advancement in Data Science, E-learning and Information Systems (ICADEIS), Nov. 2022, 5 pages.

Setlur, Vidya, et al., "Travel Scrapbooks: Creating Rich Visual Travel Narratives", Proceedings of the 2009 IEEE International Conference on Multimedia and Expo, Jul. 2009, pp. 1314-1317.

Yochum, Phatpicha, et al., "An Adaptive Genetic Algorithm for Personalized Itinerary Planning", IEEE Access, vol. 8, Apr. 29, 2020, 11 pages.

U.S. Appl. No. 17/957,903, "Non-Final Office Action", U.S. Appl. No. 17/957,903, Jun. 6, 2024, 27 pages.

Blackwood, Emily, "How to take a good selfie with your iPhone", Backlight [online] [retrieved Aug. 8, 2022]. Retrieved from the Internet <https://backlightblog.com/how-to-take-a-good-selfie>, Nov. 3, 2021, 15 Pages.

Fueneco, "Back Camera Selfie Pro", Fueneco [retrieved Aug. 8, 2022]. Retrieved from the Internet <https://play.google.com/store/apps/details?id=com.fueneco.backcameraselfiepro>., Feb. 2016, 3 Pages.

Google, "Google Photos Help", Google [retrieved Aug. 8, 2022]. Retrieved from the Internet <https://support.google.com/photos/answer/6128838?hl=en&co=GENIE.Platform%3DAndroid>., 3 Pages.

Google, "Travel Help", Google [retrieved Aug. 8, 2022]. Retrieved from the Internet <https://support.google.com/travel/answer/9098125?hl=en>, 3 Pages.

U.S. Appl. No. 17/957,455, "Final Office Action", U.S. Appl. No. 17/957,455, Oct. 22, 2024, 48 pages.

U.S. Appl. No. 17/957,903, "Corrected Notice of Allowability", U.S. Appl. No. 17/957,903, Nov. 27, 2024, 2 pages.

U.S. Appl. No. 17/957,903, "Notice of Allowance", U.S. Appl. No. 17/957,903, Oct. 9, 2024, 9 pages.

U.S. Appl. No. 17/957,955, "Non-Final Office Action", U.S. Appl. No. 17/957,955, Sep. 26, 2024, 33 pages.

Lindecrantz, Erik, et al., "Personalizing the customer experience: Driving differentiation in retail", McKinsey & Company <https://www.mckinsey.com/industries/retail/our-insights/personalizing-the-customer-experience-driving-differentiation-in-retail>, Apr. 28, 2020, 14 pages.

"Non-Final Office Action", U.S. Appl. No. 17/957,455, Feb. 13, 2025, 38 pages.

"Final Office Action", U.S. Appl. No. 17/957,955, Mar. 3, 2025, 59 pages.

"Advisory Action", U.S. Appl. No. 17/957,955, filed May 14, 2025, 3 pages.

* cited by examiner

PERSONALIZED PRODUCT RECOMMENDATIONS BASED ON AN ITINERARY

BACKGROUND

The proliferation of modern devices with enhanced digital content capture capabilities has led to an increase in the availability of a variety of digital content captured at locations around the world. Accordingly, a user preparing for a trip is able to view photographs of locations that other people have taken. However, viewing photographs of other individuals fails to provide a comprehensive idea of how a user may prepare to visit the location. Current ways for informing trip preparations are limited and time consuming, which can reduce user satisfaction and efficiency.

BRIEF DESCRIPTION OF THE DRAWINGS

Aspects of personalized product recommendations based on an itinerary are described with reference to the following Figures. The same numbers may be used throughout to reference similar features and components that are shown in the Figures.

DETAILED DESCRIPTION

Figure 1:
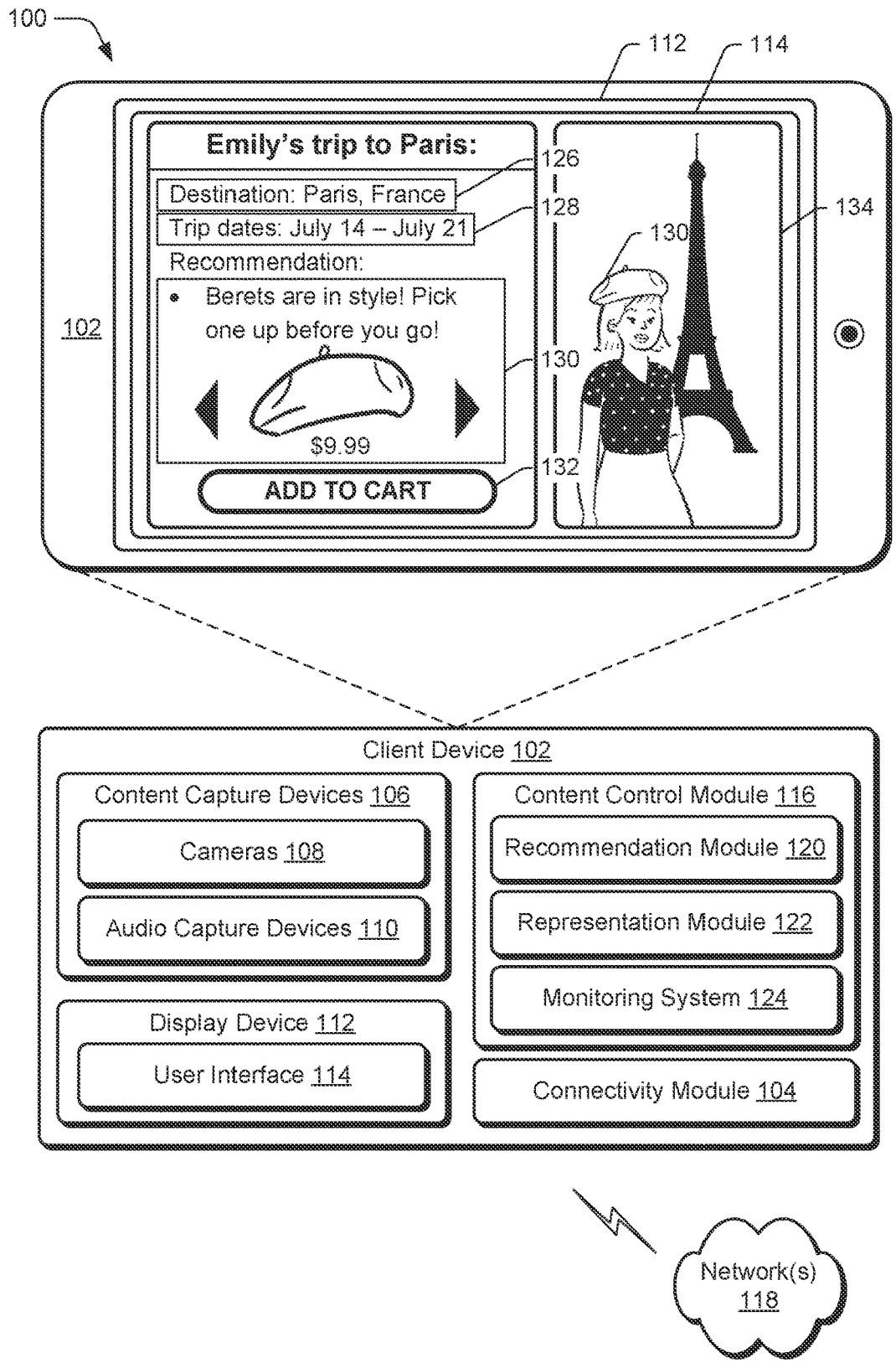
FIG. 1 illustrates an example environment in which aspects of personalized product recommendations based on an itinerary can be implemented.

Techniques for personalized product recommendations based on an itinerary are described and are implementable to generate a recommendation for a good and/or service based on product data associated with a destination. The described implementations, for instance, enable generation of a recommendation for a user to acquire the good and/or service prior to visiting the destination based on digital content associated with the destination. The described implementations further enable generation of synthetic digital content that depicts the user at the destination with the good and/or service. Additionally, the techniques described herein include a monitoring system that is operable to detect a development related to the destination, and generate an updated recommendation based on the development.

According to various implementations, a client device includes a content control module that is operable to receive an input including a destination. For instance, the input includes an itinerary such as a travel itinerary that specifies one or more destinations that a user of the client device intends to visit, e.g., a city, a sight such as a historical monument, an address, etc. The input can further include additional criteria such as travel parameters that are usable in generating the recommendations as further described below. In an example, the travel parameters include one or more of a search radius around the destination, a time range such as times of the day and/or days of the week/month/year, style preferences, one or more themes, and/or a selection of particular individuals to visit the destination. In some embodiments, the itinerary also includes one or more digital content albums that depict the user at the destination.

In some examples, the input is based on a user query, e.g., a request by a user in a user interface specifying the destination. In additional or alternative examples, the content control module is operable to detect the destination and/or the parameters automatically and without user intervention. For instance, the destination is detected automatically via a mapping application, e.g., as input into Google Maps, Apple Maps, MapQuest, Waze, etc. The content control module is also operable to detect a variety of digital content that indicates upcoming travel to the destination such as a lodging reservation, travel receipts, saved calendar events, various preconfigured itineraries, event tickets, a transportation reservation, etc.

Based on the input, the content control module is operable to collect a variety of product data associated with the destination. The product data can include digital content (e.g., photos, videos, augmented reality/virtual reality ("AR/VR") content, text, etc.) that depicts the destination and includes representations of goods and/or services. For instance, the digital content depicts goods such as clothing items, accessories, food, drinks, convenience products, vehicles, etc. The digital content can also depict various services, such as activities associated with the destination, sporting/music/arts events, a tour guide, restaurants, a spa, resorts, etc. In various embodiments, the product data is collected using one or more web-scraping techniques. For instance, the content control module is operable to employ one or more bots and/or web crawlers to compile various instances of digital content that represent scenes from the destination, e.g., from one or more social media platforms. The bots and/or web crawlers are also configurable to generate the product data based on text such as articles or suggestions from travel websites, reviews, forum posts, etc. that pertain to goods and/or services associated with the destination.

The product data can also be collected based on the travel parameters. For instance, the content control module is operable to filter instances of digital content based on a search radius around the one or more destination, a time range such as times of the day and/or days of the week/month/year, style preferences, type of recommendation, one or more themes, etc. Consider, for instance, an example in which the user of the client device is planning a trip to Machu Picchu, Peru for January $4^{th}$-January $8^{th}$. The content control module is operable to collect instances of digital content that depict Machu Picchu on and/or around January $4^{th}$-January $8^{th}$. Further, consider that one of the parameters specifies that the user desires recommendations for hats/headwear. The content control module is thus operable to collect product data including digital content that depicts individuals wearing hats at Machu Picchu.

Based on the product data, the content control module is operable to generate a recommendation for a good and/or service. Generally, the recommendation represents a "desirable" good and/or service for the user, e.g., one that is suggested for the user based on functionality, fashion, theme, etc. Accordingly, the recommendation can be based on goods or services that are determined to be popular and/or "in style" at the destination based on the product data. To do so, in one example the recommendation is based on a prevalence of particular goods or services depicted by the product data, e.g., a number of instances that the good and/or service is included in instances of the digital content. To identify goods and/or services in a given instance of digital content, the content control module is operable to employ image recognition techniques to identify the goods and/or services. In various examples, the recommendation is based in part or in whole on product reviews for the good and/or service, social media statistics (e.g., a number of "likes" and/or "shares") associated with the product data, AI-based content scoring algorithms, machine learning based image popularity assessments, etc.

The recommendation can further be based on a variety of factors associated with the destination such as forecasted weather conditions, a particular time of day/week/month/year that the user is to visit the destination, detected events, local mandates, guidelines, regional social norms, etc. In one or more examples, the recommendation is based on factors associated with the user, such as user demographics (e.g., age, gender, income level, race, ethnicity, etc.), style preferences, theme preferences, size of the user, etc. For example, the content control module is operable to access stored user data to generate recommendations for clothing that will fit the user.

In various examples, generating the recommendation includes calculating a product recommendation score, e.g., that indicates a likelihood of conversion by the user. The product recommendation score can be based on a variety of factors such as a correspondence of goods and/or services to the user, social media statistics associated with the goods and/or services, a "rating" of the goods and/or services, etc. Continuing the above example in which the user is planning a trip to Machu Picchu, the content control module is operable to generate a recommendation for a good and/or service. For instance, the content control module leverages image recognition techniques to detect an abundance of alpaca wool hats depicted by the digital content of the product data. Further, the content control module can access data about the user indicating that the user wears a small hat. Accordingly, the content control module is operable to generate a recommendation for a size small alpaca wool hat.

Once generated, the content control module is operable to output the recommendation in a user interface of the client device. In an example, the recommendation includes a purchasing option to acquire the good and/or service, such as a link to acquire the good and/or service from a third-party vendor. Alternatively or additionally, the recommendation includes directions to acquire the good and/or service, such as directions to a brick and mortar store that distributes the good and/or service. Continuing the above example, the content control module is operable to display the recommendation for the alpaca hat in the user interface of the client device, along with a link to purchase the hat. Further, the recommendation is configured to provide a geolocation that the user can acquire the alpaca hat, e.g., an address of a local shop in the city of Cuzco, Peru before the user visits Machu Pichu.

Additionally, the content control module is operable to generate synthetic digital content depicting the user with the good and/or service at the destination. For instance, the content control module is operable to incorporate a representation of the user into one or more scenes that depict the destination. The content control module is further operable to include the recommended good and/or service into the representation of the user. In various examples, the synthetic digital content is configured as an album including a plurality of instances of digital content, e.g., various images and videos. Further, the synthetic digital content can be based on one or more themes. In the above example, the content control module is employed to generate synthetic digital content that depicts the user at Machu Picchu, wearing the recommended alpaca hat. In this way, the content control module is operable to generate digital images that enable a user to visualize how the user will look at a destination with a recommended good and/or service.

In some implementations, the content control module includes a monitoring system that is operable to detect a development related to the destination. Generally, the development describes a change to the itinerary and/or variable conditions that impact the recommendation. Developments include a variety of scenarios, such as a weather update, an addition/cancellation/change to an event, a change in local style/fashion, a local directive particular to the destination, a developing geopolitical situation, construction/renovation events, a regional health mandate, natural disaster or occurrence, etc. The content control module is operable to detect the development in a variety of ways such as via a query to a travel advisory system, through one or more applications of the client device (e.g., a weather application, an event application, reservation application, etc.), using web-scraping operations, etc.

Based on the development, the content control module is operable to generate an updated recommendation. The updated recommendation can pertain to a good and/or service, as well as one or more of a change to an itinerary, a changed location to capture digital content, settings that are recommended to obtain a content capture based on the development, etc. Continuing the above example, consider that the content control module detects that a forecast for the weather at Machu Picchu for January $4^{th}$-$8^{th}$ has recently changed from cold and dry, to heavy rain. The content control module is operable to generate an updated recommendation for the user, such as a rain hat and rain gear rather than an alpaca wool hat that is not waterproof. Thus, these techniques further support ongoing monitoring of a destination to generate updated recommendations for a user.

Accordingly, using the techniques described herein, the client device is operable to automatically provide intuitive recommendations for various goods and or services based on a variety of factors as well as provide visual examples that depict the user with the recommended good and/or service at the destination itself. These capabilities obviate a conventional limitation for the user to expend a great deal of time manually researching a variety of destinations. Further, the monitoring system supports continuous detection of a variety of environmental scenarios to provide a user with relevant recommendations.

While features and concepts of personalized product recommendations based on an itinerary can be implemented in any number of environments and/or configurations, aspects of personalized product recommendations based on an itinerary are described in the context of the following example systems, devices, and methods.

FIG. 1 illustrates an example environment 100 in which aspects of personalized product recommendations based on an itinerary can be implemented. The environment 100 includes a computing device such as a client device 102. The client device 102 can be implemented in a variety of different ways and form factors such as a mobile device, smartphone, tablet, wearable computing device, digital camera, laptop computer, desktop computer, webcam, a docked mobile device connected to a monitor, and so forth. These examples are not to be construed as limiting, however, and the client device 102 can be implemented in a variety of different ways and form factors. Example attributes of the client device 102 are discussed below with reference to the device 1000 of FIG. 10.

The client device 102 includes various functionality that enables the client device 102 to perform different aspects of personalized product recommendations based on an itinerary discussed herein including a connectivity module 104, content capture devices 106 including cameras 108 and audio capture devices 110, a display device 112 including a user interface 114, and a content control module 116. The connectivity module 104 represents functionality (e.g., logic and hardware) for enabling the client device 102 to interconnect with other devices, databases, storage systems, and/or networks, such as via a network 118. The connectivity module 104, for instance, enables wireless and/or wired connectivity of the client device 102 as well as accessing content stored remotely, for instance "in the cloud."

The content capture devices 106 are representative of functionality to enable various types of media to be captured via the client device 102, such as visual media and audio media. In this particular example the content capture devices 106 include photo/video capture devices such as cameras 108 and audio capture devices 110. The content capture devices 106 can include a variety of devices that are able to capture various types of media in accordance with implementations discussed herein. The content capture devices 106, for instance, include not only hardware for capturing associated media but also logic (e.g., drivers, firmware, etc.) for operating and configuring operation of the associated content capture devices 106. The display device 112 represents functionality (e.g., hardware and logic) for enabling visual output via the client device 102. For instance, via a user interface 114.

The content control module 116 represents functionality for performing various aspects of personalized product recommendations based on an itinerary described herein and is illustrated as including a recommendation module 120, a representation module 122, and a monitoring system 124. The content control module 116 is operable to receive an input including a destination, e.g., based on an itinerary such as a travel itinerary that specifies a destination for a user of the client device 102 to visit. The recommendation module 120 is operable to collect product data associated with the destination, e.g., that includes digital content that depicts one or more goods and/or services at the destination. In an example, the recommendation module 120 leverages web-scraping techniques to generate the product data. Based on the product data, the recommendation module 120 is operable to generate a recommendation, such as for a desirable good and/or service. Once generated, the content control module 116 is operable to output the recommendation, e.g., in the user interface 114.

In various examples, the representation module 122 is employed to generate synthetic digital content that depicts the user of the client device 102 at the destination with the recommended good and/or service. For instance, the representation module 122 is operable to incorporate a representation of the user into one or more scenes that depict the destination and is further operable to include the recommended good and/or service along with the representation of the user. In an example in which the good and/or service is an article of clothing, the representation module 122 is operable to generate synthetic digital content that appears as if the user were wearing the article of clothing at the destination. In some implementations, the monitoring system 124 is operable to detect a development related to the destination, such as a weather update, a local directive/mandate, a change to an event, etc. Based on the development, the monitoring system 124 is operable to generate an updated recommendation. In this way, the monitoring system 124 can dynamically detect changing conditions associated with the destination and support generation of relevant recommendations to a user.

Example operations of personalized product recommendations based on an itinerary are illustrated in FIG. 1. In this example, a user of the client device (e.g., "Emily") is planning an upcoming vacation. The recommendation module 120 receives an input including a destination 126, which in this example is Paris, France. The input further includes additional travel parameters, such as a date range 128 for the trip, e.g., July $14^{th}$ through July $21^{st}$. The recommendation module 120 is operable to collect product data, e.g., various instances of digital content, that depict scenes from the city of Paris in accordance with the date range 128. Based on the product data, the recommendation module 120 generates a recommendation, in this example a recommendation for a beret 130.

The recommendation includes a purchasing option 132 to acquire the beret 130, e.g., a link to add the beret 130 to a digital shopping cart. Further, in this example the representation module 122 is employed to generate an instance of digital content that depicts the user at the destination with the recommended good and/or service. For instance, the representation module 122 generates an image 134 that depicts Emily wearing the beret 130 in Paris, standing in front of the Eiffel Tower. In this way, the techniques described herein enable the user to efficiently preview digital content that provides a visual example of what the upcoming vacation may look like as well as preview potential purchases before actually visiting the destination.

Having discussed an example environment in which the disclosed techniques can be performed, consider now some example scenarios and implementation details for implementing the disclosed techniques.

Figure 2:
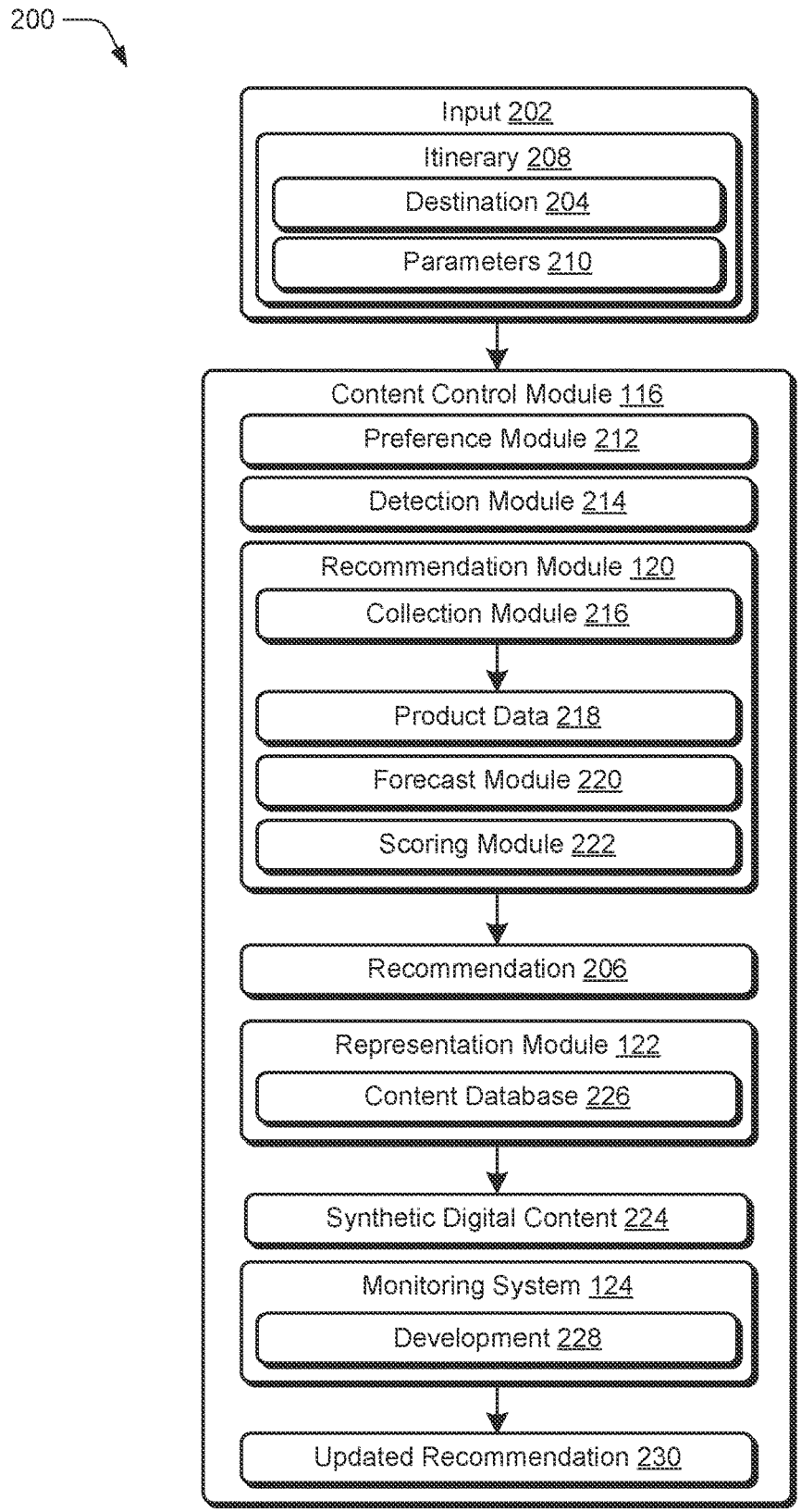
FIG. 2 depicts an example system for personalized product recommendations based on an itinerary in accordance with one or more implementations.

FIG. 2 depicts an example system 200 for personalized product recommendations based on an itinerary in accordance with one or more implementations. The system 200 can be implemented in the environment 100 and incorporates attributes of the environment 100 introduced above. In the example system 200, the content control module 116 receives an input 202 including a destination 204, e.g., one or more destinations for which a recommendation 206 is to be generated. The destination 204 can be a geographical area (e.g., a country, state, city, etc.), a sight (e.g., a monument, site, attraction, viewpoint, vista, etc.), an address, GPS coordinates (a "geolocation"), etc. In an example, the destination 204 is included as part of an itinerary 208, e.g., a travel itinerary, that specifies one or more destinations 204 that a user of the client device 102 intends to visit. The input 202 and the itinerary 208 can include additional criteria such as parameters 210 that are usable in generating the recommendation 206 as further described below.

In an example, the parameters 210 include but are not limited to one or more of a search radius around the destination 204, a time range such as specified times of the day and/or days of the week/month/year, user preferences (e.g., style preferences), user data, one or more themes (e.g., adventurous theme, historical theme, nightlife theme, educational theme, sports theme, upscale theme, nature theme, etc.), and/or a selection of particular individuals to visit the destination 204. In some embodiments, the itinerary 208 includes one or more digital content albums that depict the user and/or other individuals at the destination 204. The parameters can also include style preferences such as a variety of styles including formal, semi-formal, casual, business-casual, vintage, chic, trendy, unique, popular, vibrant, etc. The style preferences can be user defined, e.g., by a user in the user interface 114.

The style preferences can also be determined automatically and without user intervention, e.g., by using one or more image recognition techniques. For instance, the content control module 116 includes a preference module 212 that can access a variety of digital content that depicts one or more individuals for which the recommendation 206 is to be generated, e.g., the user of the client device 102. The digital content can be maintained in storage of the client device 102 and/or stored remotely such as "in the cloud." The preference module 212 can leverage one or more image recognition techniques such as a clothing image artificial intelligence ("AI") detection model to detect goods such as clothing or apparel that the individual is wearing in the digital content depicting the individual. In this way, the preference module 212 can extrapolate user preferences that indicate desirable goods and/or services in a variety of contexts.

In some examples, the input 202 is based on a user query, e.g., a request by a user in the user interface 114 specifying the destination 204 and/or the one or more parameters 210. The input 202 can also be detected in whole or in part automatically and without user intervention. For instance, the content control module 116 includes a detection module 214 that is operable to detect the destination 204 and/or the parameters 210. In one example, the detection module 214 is operable to detect the destination 204 and/or the parameters 210 based on content that indicates travel to the destination 204 such as an input to a mapping application, lodging reservation, travel receipts, saved calendar events, various preconfigured itineraries, event tickets, search history, and/or transportation reservations. For instance, the detection module 214 is operable to query various flight/travel booking applications, devices, systems etc. to detect the input 202.

A recommendation module 120 includes a collection module 216 to collect a variety of product data 218 associated with the destination 204. Generally, the product data represents information and/or content describing goods and/or services as they relate to the destination 204. The product data 218 can include digital content (e.g., photos, videos, augmented reality/virtual reality ("AR/VR") content, etc.) that depicts the destination 204 and includes representations of goods and/or services. For instance, the digital content depicts goods such as clothing items, accessories, food, drinks, convenience products, equipment, vehicles, etc. The digital content can also depict various services, such as activities associated with the destination 204, sporting/music/arts events, a tour guide service, various restaurants, classes and/or lessons (e.g., a cooking class), a spa and/or resort service, etc. The product data 218 can further include various text inputs, e.g., that describe the goods and/or services in relation to the destination 204.

In various embodiments, the collection module 216 collects the product data 218 using one or more web-scraping and/or web-crawling techniques. For instance, the collection module 216 is operable to employ one or more bots and/or web crawlers to compile various instances of digital content that represent scenes from the destination 204, e.g., from one or more social media platforms, websites, databases, etc. The bots and/or web crawlers are also configurable to generate the product data 218 based on text such as articles or suggestions from travel websites, reviews, forum posts, etc. that pertain to goods and/or services associated with the destination 204. The collection module 216 can also collect the product data 218 based on the parameters 210. For instance, the collection module 216 is operable to filter instances of digital content based on a search radius around the one or more destination 204, a time range such as specified times of the day and/or days of the week/month/year, style preferences, type of recommendation, one or more themes, etc. In this way, the techniques described herein increase computational efficiency by filtering out digital content likely not to be of interest to a user as well as increase user satisfaction by collecting relevant product data 218.

Based on the product data 218, the recommendation module 120 is operable to generate a recommendation 206, e.g., a recommendation for a good and/or service. Generally, the recommendation 206 represents a "desirable" good and/or service for the user, e.g., one that is suggested for the user based on functionality, fashion, theme, etc. Accordingly, the recommendation 206 can be based on goods and/or services that are determined to be popular and/or "in style" at the destination for certain conditions based on the product data 218. To do so, in one example the recommendation 206 is based on a prevalence of particular goods and/or services depicted by the product data 218, e.g., a number of instances that the good and/or service is included in instances of the digital content. To detect the presence of goods and/or services in a given instance of digital content, the recommendation module 120 is operable to employ a variety of image recognition techniques to identify the goods and/or services. In various examples, the recommendation 206 is based in part or in whole on product reviews for the good and/or service, social media statistics (e.g., a number of "likes" and/or "shares") associated with the product data, AI-based content scoring algorithms, machine learning based image popularity assessments, etc. In this way, the recommendation module 120 can generate recommendations 206 that follow dynamically changing trends and styles, which is not possible using conventional techniques.

The recommendation 206 can further be based on a variety of factors associated with the destination 204 such as forecasted weather conditions, time of day/week/month/year that the user is to visit the destination, detected events at the destination 204, local mandates, guidelines, regional social norms, etc. In one example, the recommendation module 120 includes a forecast module 220 that is operable to determine a weather forecast for the destination 204 for a time that the user is to visit the destination 204. The forecast module 220 does so, for instance, via one or more weather applications, via a query to one or more weather services, via one or more sensors of the client device 102, etc. In one or more examples, the recommendation is based on factors associated with the user, such as user demographics (e.g., age, gender, nationality, income level, race, ethnicity, etc.), style preferences, height and/or weight of the user, user clothing sizes, theme preferences, etc.

For instance, the recommendation 206 can be based on demographics of individuals to visit the destination 204. Consider an example in which the user of a client device 102 is a 40-year-old-man from Ireland. Accordingly, the recommendation module 120 is operable to generate a recommendation 206 for a good and/or service that is particular to the user, e.g., for a 40-year-old man from Ireland. Further, the recommendation 206 can be based on clothing sizes and/or measurements of an individual. In various examples, the recommendation module 120 is operable to access size data (e.g., accessed remotely and/or stored on the client device 102) including clothing associated with various individuals to generate the recommendation 206, e.g., such that a recommendation 206 for a clothing item "fits" the individual.

In another example, the recommendation 206 can be based on a theme preference, e.g., as specified by the parameters 210. As noted above, a variety of themes are considered, such as an adventurous theme, nature theme, historical theme, upscale theme, nightlife theme, educational theme, sports theme, etc. The recommendation module 120 can generate a recommendation 206 in accordance with such themes. In an example a user query specifies a "sports theme" for an upcoming vacation to a destination 204. Accordingly, the recommendation 206 includes goods and/or services that adhere to the sports theme, e.g., sports apparel particular to the destination 204 such as a local soccer team's jersey and tickets to a game.

In various examples, the recommendation module 120 includes a scoring module 222 that is operable to generate a product recommendation score, e.g., that indicates a likelihood of conversion by the user and/or a likelihood of user satisfaction with the good and/or service. The product recommendation score can be based on a variety of factors such as a correspondence of goods and/or services to the user, social media statistics associated with goods and/or services, a "rating" of the goods and/or services such as a product rating score, etc. In one example, calculating the product recommendation score includes determining a correlation between various goods and/or services with the style preferences as discussed above. In this way, the recommendation module 120 can generate recommendations 206 based on a variety of factors that are custom tailored to a particular individual, for a particular destination 204, and for particular conditions.

Once generated, the content control module 116 is operable to output the recommendation 206 in the user interface 114 of the client device 102. In an example, the recommendation 206 includes a purchasing option to acquire the good and/or service, such as a link to acquire the good and/or service from a third-party platform. Alternatively or additionally, the recommendation 206 includes directions to acquire the good and/or service, such as directions to a brick and mortar store that distributes the good and/or service. In one example, a purveyor of a recommended good and/or service is a street vendor, and as such does not have an online presence nor does the purveyor have a store location. Accordingly, in this example the recommendation 206 includes one or more of a geolocation, instructions, contact information, etc. for the user to acquire the recommended good and/or service. In some implementations, the recommendation 206 includes more than one recommended good and/or service, and the recommendation 206 is configured as a list, e.g., a shopping list.

The content control module 116 also includes a representation module 122 that is operable to generate synthetic digital content 224 that depicts the user with the good and/or service at the destination 204. For instance, the representation module 122 is operable to incorporate a representation of the user into one or more scenes that depict the destination 204. The content control module is further operable to include the recommended good and/or service into the representation of the user. To do so, in some examples the representation module 122 leverages an artificial intelligence ("AI") based segmentation algorithm to generate the synthetic digital content 224, e.g., based on digital content that depicts the user, digital content that depicts the destination 204, and digital content that depicts the good and/or service. In various examples, such digital content is stored on the client device 102, e.g., in a content database 226. In alternative or additional examples, such digital content is stored remotely such as "in the cloud." In various examples, the synthetic digital content 224 is configured as an album including a plurality of instances of digital content, e.g., various images and videos. Further, the synthetic digital content 224 can be based on one or more themes, and thus the synthetic digital content 224 can include one or more theme-based albums.

The representation module 122 is further operable to adjust visual properties of the various digital content. For instance, the representation module 122 is operable to adjust the sizing, location, positioning, contrast, exposure, lighting, resolution, etc. of portions of the digital content that represents the user, destination 204, and/or the good and/or service as part of generating the synthetic digital content 224. In various examples, the representation module 122 is operable to add visual effects, edits and/or features, such as shadows, filters, blending, etc. to the synthetic digital content 224. In various examples, the visual effect is based on a relative intensity and location of a light source in an instance of the synthetic digital content 224. Consider, for instance, an example in which a recommendation 206 for a user is for a cowboy hat, and a scene depicting the destination 204 includes the sun overhead. The representation module 122 is operable to generate synthetic digital content 224 that depicts the user wearing the cowboy hat at the destination and apply one or more shadow effects to replicate the impact of the sun as a light source. In this way, the synthetic digital content 224 is generated in a photorealistic manner and enables visualization of how the user will look at a destination 204 with a recommended good and/or service.

In some embodiments, the content control module 116 includes a monitoring system 124. In an example, the monitoring system 124 is operable to receive an input specifying the destination 204, e.g., as part of an itinerary 208. In some implementations, the input also includes a recommendation for a user based on the itinerary 208, e.g., a recommendation 206 as described above. The monitoring system 124 is operable to detect a development 228 related to the destination 204. Generally, the development 228 describes a change to the itinerary 208 and/or variable conditions that impact the recommendation 206.

Developments 228 can include a variety of scenarios, such as a weather update, an addition/cancellation/change to an event, a local directive particular to the destination 204, a change in local trends/style/fashion, a recent discount for one or more goods and/or services, a developing geopolitical situation, construction/renovation events, a regional health mandate, an outbreak of an illness, a natural disaster or occurrence, etc. The monitoring system 124 is operable to detect the development 228 in a variety of ways such as via a query to one or more travel advisory systems, through one or more applications of the client device 102 (e.g., a weather application, an event application, reservation application, etc.), using web-scraping operations as described above, etc. In one example, the monitoring system 124 utilizes web scraping techniques to collect information from one or more social media platforms to detect the development 228.

Based on the development 228, the monitoring system 124 is operable to generate an updated recommendation 230, e.g., using the techniques described above with respect to the recommendation module 120. That is, the monitoring system 124 can be configured to perform the same or similar functionality of the recommendation module 120. Alternatively or additionally, the monitoring system 124 is operable to employ the recommendation module 120 to generate the updated recommendation 230. In an example, the updated recommendation 230 includes a change to the itinerary 208, e.g., to avoid the destination 204, to include a different destination to the itinerary 208, or to adjust the time/date to visit the destination 204 based on the development 228.

In various examples, the updated recommendation 230 pertains to a suggested good and/or service based on the development 228. For instance, in response to a development 228 that includes an outbreak of an illness, the updated recommendation 230 includes a suggestion to obtain a medical good and/or service based on the outbreak. In another example, the development 228 includes an announcement of an event at or in proximity to the destination 204, such as a music concert. Thus, the updated recommendation 230 includes a good and/or service related to the event, such as a t-shirt for the music concert. In a further example, the development 228 includes a weather event (e.g., a forecasted rainstorm at the destination 204), and the updated recommendation 230 includes a shopping list based on the weather event, e.g., a list including a raincoat, rain boots, umbrella, etc. The updated recommendation 230 can further include a purchasing option to acquire the goods and/or services, for instance purchasing options as described above. In one or more examples, the updated recommendation 230 includes a promotion related to the suggested good and/or service, such as a deal, coupon, etc.

In some examples, the recommendation 206 includes a first good and/or service. Based on the development 228, the monitoring system 124 is operable to generate the updated recommendation 230 for a second good and/or service, e.g., a different good and/or service in lieu of or in addition to the first good and/or service. Consider an example in which a user of the client device 102 is planning a backpacking trip to Glacier National Park. Using the techniques described above, the recommendation module 120 generates a recommendation 206 for campfire making materials, e.g., a fire starter and tinder. However, in this example, due to persistent dry weather conditions, the National Park Service has recently instituted a burn ban that prohibits open fires within the park but allows self-contained propane camp stoves. Accordingly, the monitoring system 124 is operable to detect this development 228 (e.g., the burn ban) and generate an updated recommendation 230 for a propane camp stove.

Additionally, in some examples the recommendation 206 includes synthetic digital content 224 that depicts the user at the destination 204 with the recommended good and/or service. The monitoring system 124 is operable to generate updated instances of the synthetic digital content 224 to depict the user with a good and/or service included in the updated recommendation 230, e.g., using the techniques described above with respect to the representation module 122. That is, the monitoring system 124 can be configured to perform the same or similar functionality of the representation module 122. Alternatively or additionally, the monitoring system 124 is operable to employ the representation module 122 to generate the updated recommendation 230. Continuing the above example, the recommendation 206 includes a digital image of the user sitting near a campfire at Glacier National Park. Accordingly, the updated recommendation 230 is configured to include a digital image of the user cooking on a camp stove at Glacier National Park.

In another example, the recommendation 206 includes a suggestion for user to obtain a particular content capture at the destination 204, e.g., directions for a user to take a photograph at a particular site at the destination 204. The recommendation 206 further includes one or more suggested configuration settings for a content capture device 106 of the client device 102, such as whether to user a front or rear camera 108 of the client device 102, how to orient the client device, various suggested settings such as aperture size, shutter speed, ISO, brightness settings, flash settings, night mode, exposure settings, image filters, contrast settings, etc. In this example, consider that the particular site has become unavailable due to a development 228, such as being closed for emergency construction. Accordingly, based on the development 228, the monitoring system 124 is operable to generate the updated recommendation 230 which includes a suggestion for a different site for the user to obtain a content capture. In this example, the updated recommendation 230 further includes updated device configuration settings to obtain the content capture based on the development 228.

Thus, the updated recommendation 230 can be based on a variety of extrinsic factors and can include a variety of content such as an updated product recommendation, a suggested location to capture digital content, settings that are recommended to obtain a content capture based on the development 228, a suggestion to adjust one or more other parameters 210 associated with the itinerary 208, a variety of synthetic digital content 224 as described above, etc. Once generated, the updated recommendation 230 is output in the user interface 114. Thus, the techniques described herein further support ongoing monitoring of the destination 204 to generate updated recommendations 230 for a user.

Figure 3:
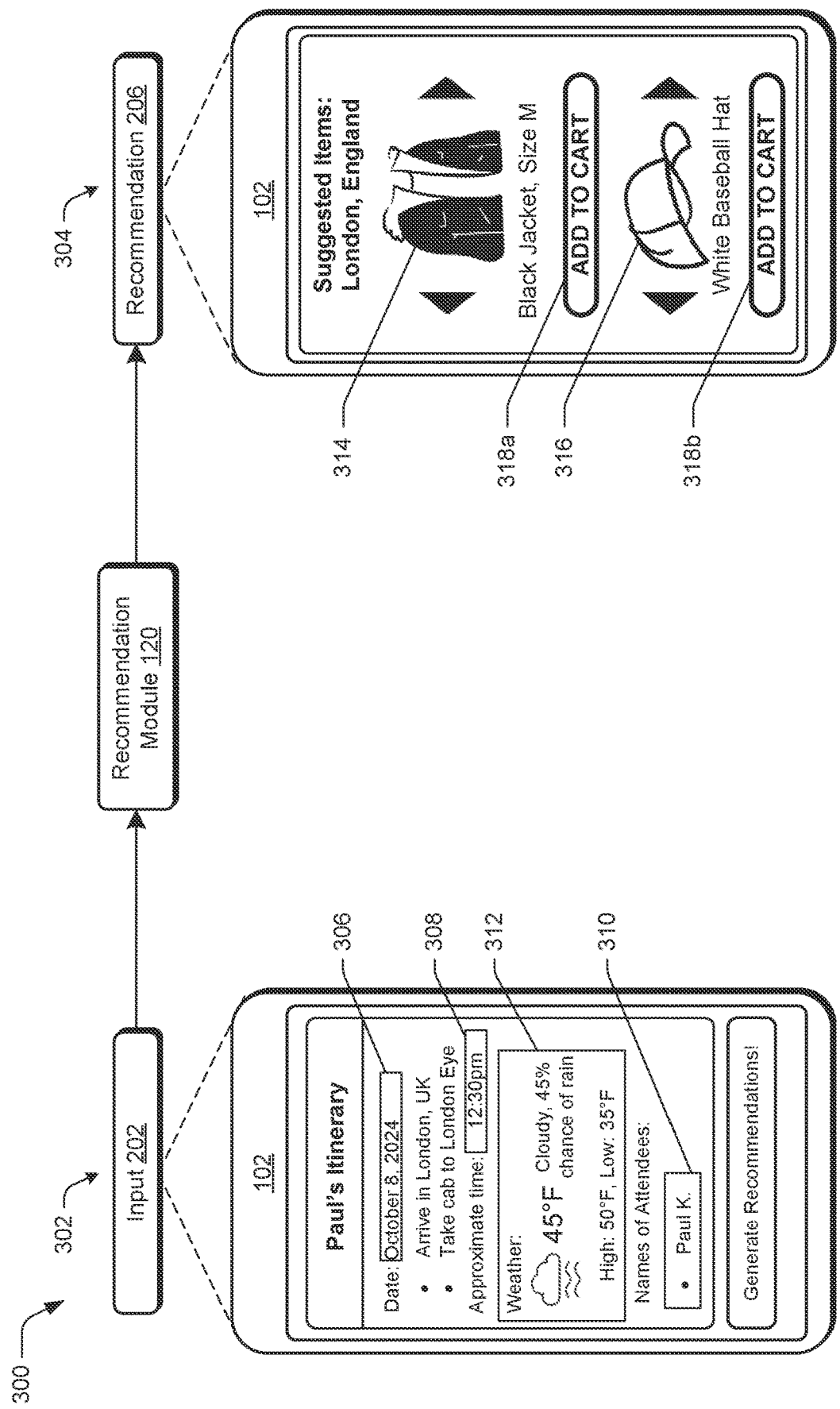
FIG. 3 depicts an example implementation for personalized product recommendations based on an itinerary in accordance with one or more implementations.

FIG. 3 depicts an example implementation 300 for personalized product recommendations based on an itinerary in accordance with one or more implementations. In this example, shown in first stage 302 and second stage 304, the content control module 116 is operable to receive an input 202 including an itinerary 208 for a user of the client device 102. As shown in first stage 302, the itinerary 208 includes a destination 204, which in this example is the London Eye Ferris wheel in London, England. The itinerary 208 further includes additional parameters 210, such as a date 306 (e.g., Oct. 8, 2024), a time 308 (e.g., 12:30 PM), as well as a name 310 of the individuals that will be visiting the destination 204, in this example "Paul K." The itinerary 208 also includes a weather forecast 312 for the time period that Paul will be at the London Eye. In this example, the weather forecast 312 indicates that the weather will be chilly with a temperature of 45 degrees, cloudy, and with a 45% chance of rain.

Accordingly, the recommendation module 120 is operable to generate a recommendation 206 based on the destination 204 and the parameters 210 included in the itinerary 208 in accordance with the techniques described above. For instance, the recommendation 206 is based on product data 218 including a variety of digital content depicting the destination 204 under similar conditions. In this example, for instance, the recommendation 206 is based on digital content depicting London in October in similar weather conditions, e.g., 45 degrees and cloudy. In accordance with the techniques herein, the recommendation module 120 is operable to generate a recommendation 206 that is practical for the conditions, as well as "popular" as indicated by the product data 218. For instance, as illustrated in second stage 304, the recommendation 206 is output in the user interface 114 of the client device 102 and includes two suggested items, for instance a black jacket 314 and a white baseball hat 316. The recommendation 206 further includes a purchase option associated with the jacket 314 and the hat 316, e.g., the "add to cart" buttons 318a, 318b. Thus, the recommendation 206 for a good and/or service is based on the destination 204 as well as the conditions at the destination 204.

Figure 4:
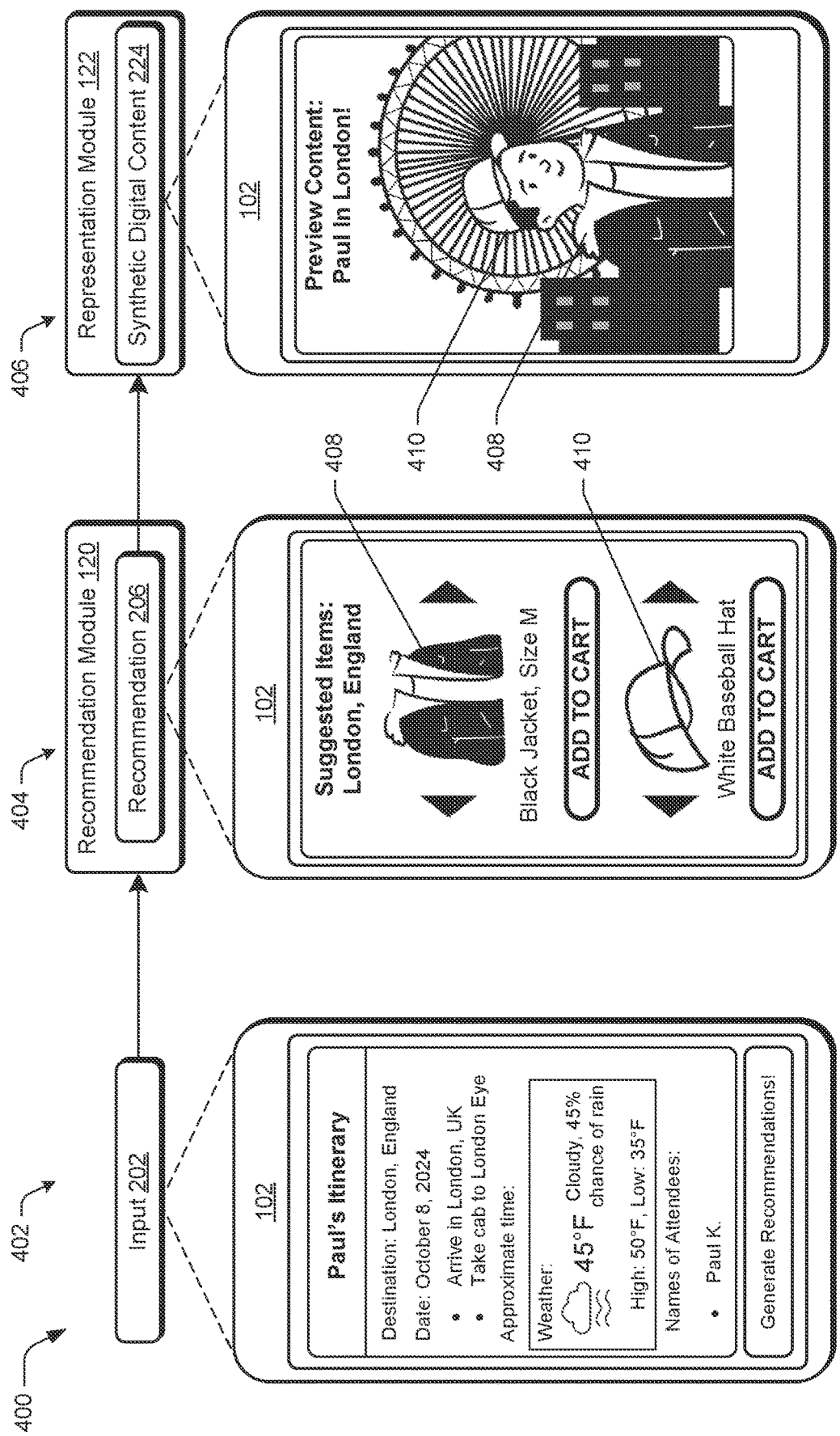
FIG. 4 depicts an example implementation for personalized product recommendations based on an itinerary further depicting generation of synthetic digital content in accordance with one or more implementations.

FIG. 4 depicts an example implementation 400 for personalized product recommendations based on an itinerary further depicting generation of synthetic digital content in accordance with one or more implementations. In this example, shown in first stage 402, second stage 404, and third stage 406, the content control module 116 further includes a representation module 122 to generate synthetic digital content 224. The first stage 402 and the second stage 404 are similar to the above example depicted in FIG. 3. For instance, based on an itinerary 208 shown in the first stage 402, the recommendation module 120 is operable to generate a recommendation 206 including a black jacket 408 and a white baseball hat 410. In this example, the black jacket 408 is recommended based in part on the weather, e.g., as being cold with a chance of rain. The white hat 410 is recommended based in part on a determination that white hats are "in style." Accordingly, the recommendation 206 is based on a variety of considerations.

As shown in the third stage 406, the representation module 122 is operable to generate synthetic digital content 224 that depicts an individual with the good and/or service at the destination 204. To do so, in this example the representation module 122 leverages an artificial intelligence ("AI") based segmentation algorithm to generate the synthetic digital content 224, e.g., based on digital content that depicts Paul, digital content that depicts the London Eye, and digital content that depicts the jacket 408 and the hat 410. In this way, the synthetic digital content 224 is generated and depicts Paul at the London Eye Ferris wheel in London wearing the jacket 408 and the hat 410.

Figure 5:
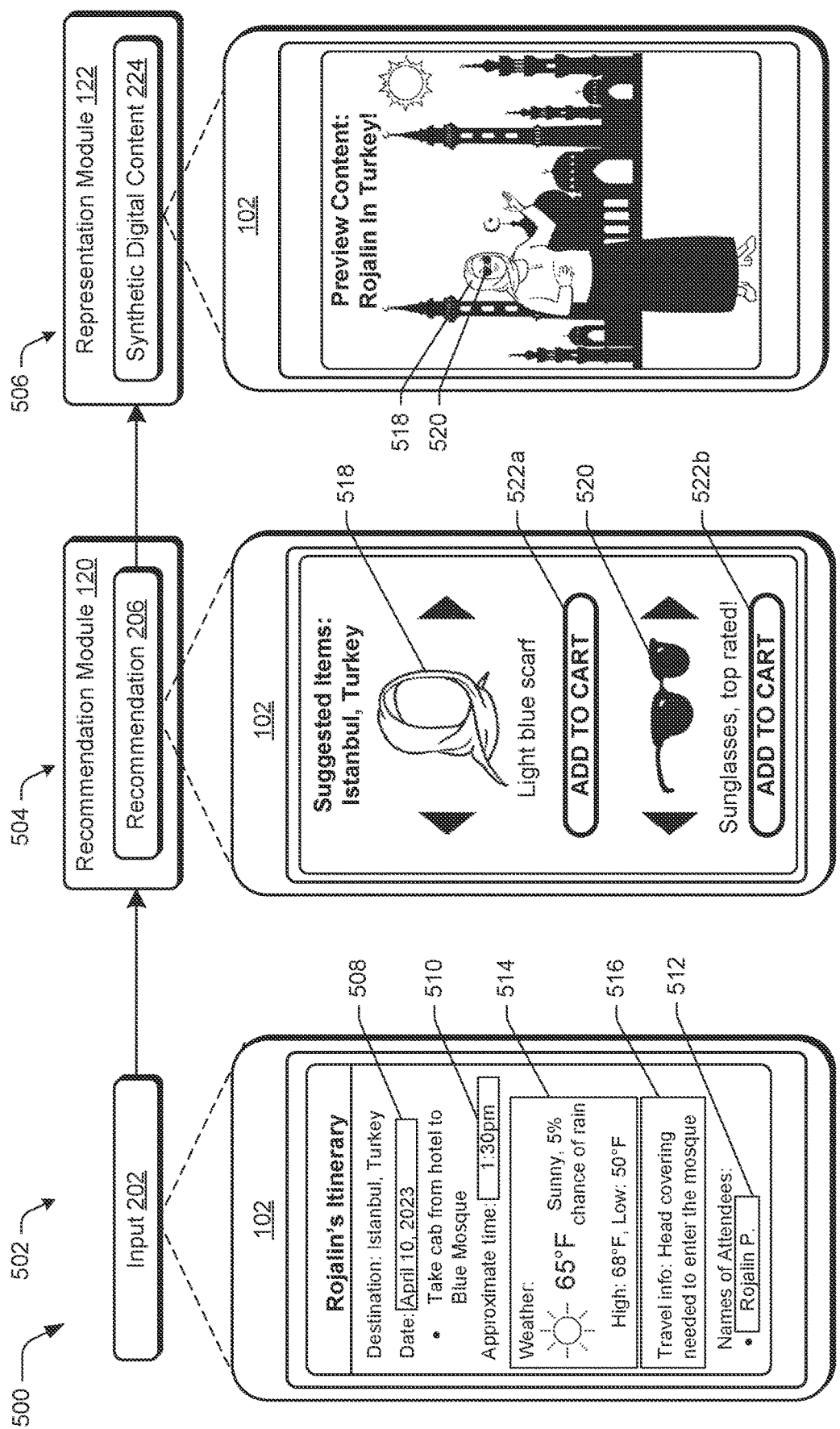
FIG. 5 depicts an example implementation for personalized product recommendations based on an itinerary in which the recommendation is based on several factors in accordance with one or more implementations.

FIG. 5 depicts an example implementation 500 for personalized product recommendations based on an itinerary in which the recommendation is based on several factors in accordance with one or more implementations. In this example, shown in first stage 502, second stage 504, and third stage 506, the content control module 116 is operable to receive an input 202 including an itinerary 208 for a user of the client device 102. As shown in first stage 502, the itinerary 208 includes a destination 204, which in this example is the Blue Mosque in Istanbul, Turkey. The itinerary 208 further includes additional parameters 210, such as a date 508 (e.g., Apr. 10, 2023), an approximate time 510 (e.g., 1:30 PM), as well as a name 512 of the individuals that will be visiting the destination 204, in this example "Rojalin P." The itinerary 208 also includes a weather forecast 514 for the time period that Rojalin P. will be visiting the Blue Mosque. In this example, the weather forecast 514 indicates that the weather will be sunny and around 65 degrees. The user interface 114 also depicts travel information 516 that indicates that a head covering is required to enter the Blue Mosque, e.g., as detected by the content control module 116.

Accordingly, the recommendation module 120 is employed to generate a recommendation 206 based on the information included in the itinerary 208 in accordance with the techniques described above. For instance, the recommendation 206 is based on product data 218 including a variety of digital content depicting the destination 204 under similar conditions. In this example, for instance, the recommendation 206 is based in part on digital content depicting the Blue Mosque in April in similar weather conditions, e.g., 65 degrees and sunny. Further, the recommendation 206 is based on the travel information 516 indicating that a head covering is required to enter the mosque. The recommendation 206 is further based on one or more user preferences, e.g., that indicate that Rojalin prefers the color light blue, as well as one or more product ratings.

As illustrated in second stage 504, the recommendation 206 is output in the user interface 114 of the client device 102 and includes a recommendation for a light blue scarf 518, e.g., based on the travel information 516, the user preferences, and the product data 218 as described above. The recommendation 206 also includes a recommendation for a pair of sunglasses 520, e.g., based on the product data 218 and the product rating that indicates that the sunglasses 520 are highly rated. The recommendation 206 further includes a purchase option associated with the scarf 518 and the sunglasses 520, e.g., the "add to cart" buttons 522a, 522b. This is by way of example and not limitation, and in other examples a purchase option may include one or more of a link to acquire the good and/or service from a third-party vendor, directions to acquire the good and/or service, access to an external marketing platform, etc.

As shown in the third stage 506, the representation module 122 is operable to generate synthetic digital content 224 that depicts an individual with the good and/or service at the destination 204. To do so, in this example the representation module 122 leverages an artificial intelligence ("AI") based segmentation algorithm to generate the synthetic digital content 224. Accordingly, the synthetic digital content 224 depicts Rojalin in front of the Blue Mosque wearing the scarf 518 and the sunglasses 520. Further, the recommendation module 120 is operable to adjust visual properties of the synthetic digital content 224 such as adjust lighting effects of the synthetic digital content 224 based on the relative position and intensity of a light source, e.g., the sun in the scene. In this way, the synthetic digital content 224 is generated in a photorealistic manner and enables visualization of how the user will look at a destination 204 with a recommended good and/or service.

Figure 6:
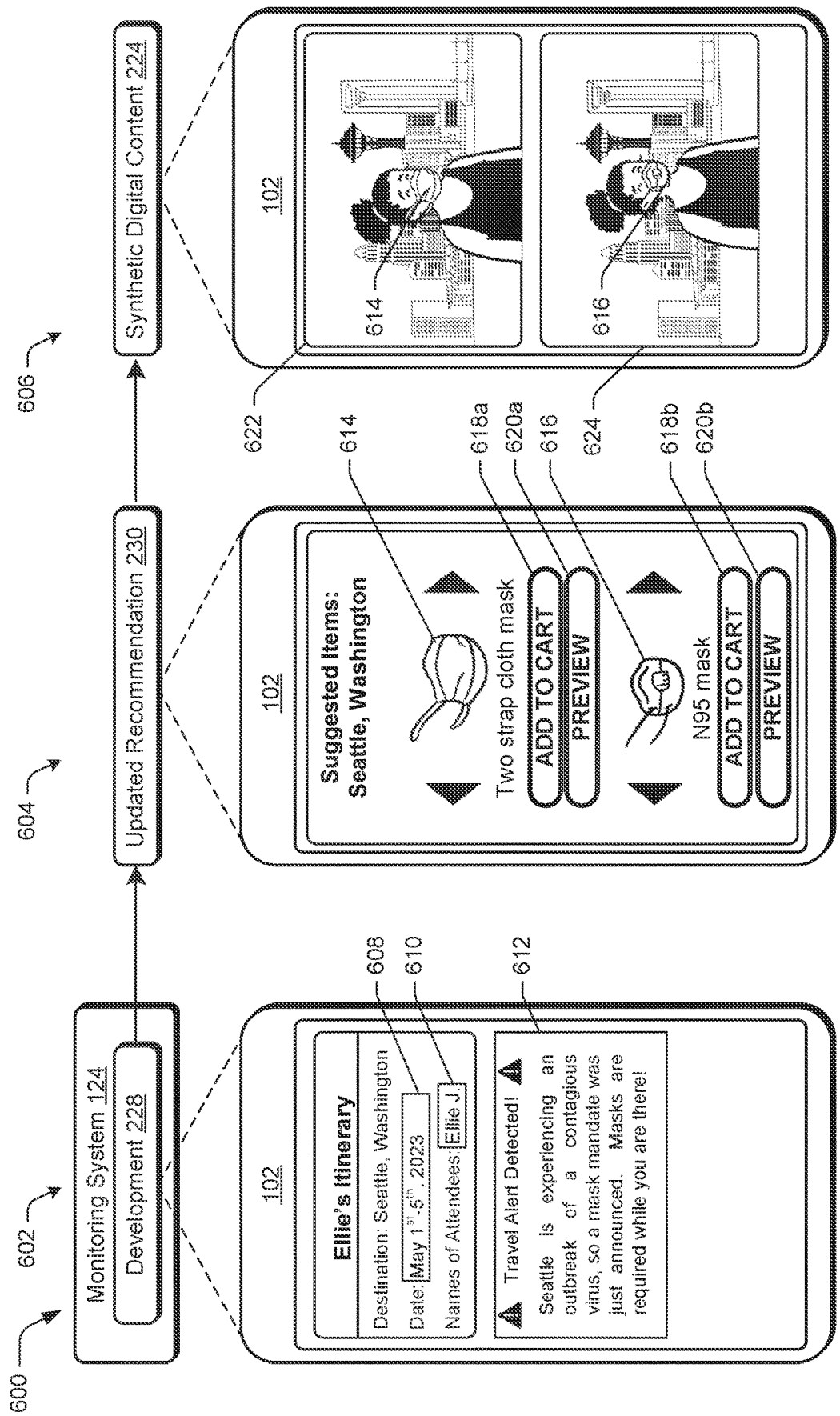
FIG. 6 depicts an example implementation for personalized product recommendations based on an itinerary depicting operation of the monitoring system in accordance with one or more implementations.

FIG. 6 depicts an example implementation 600 for personalized product recommendations based on an itinerary depicting operation of the monitoring system in accordance with one or more implementations. In this example, shown in a first stage 602, a second stage 604, and a third stage 606, the content control module 116 includes a monitoring system 124 that is operable to detect a development 228 related to a destination 204. As shown in the first stage 602, the monitoring system 124 is operable to receive an itinerary 208 that includes a destination 204, which in this example is Seattle, Washington. The itinerary further includes additional parameters 210, such as a date range 608 (e.g., May 1-May 5, 2023) as well as a name 610 of the individual that will be visiting the destination 204, in this example "Ellie J." In some examples, the monitoring system 124 is also operable to receive as input a recommendation 206 generated in accordance with the techniques described above.

In this example, the monitoring system 124 is employed to detect a development 228 related to Seattle, e.g., a travel alert 612 indicating that Seattle has recently experienced an outbreak of a contagious virus, and that a local mandate such as a mask mandate has been enacted. Accordingly, masks are required for Ellie for the duration of her visit. As shown in second stage 604, the monitoring system 124 is operable to generate an updated recommendation 230, for instance using similar techniques that are employed to generate the recommendation 206. In this example, the updated recommendation 230 includes a recommendation for a first facemask 614 as well as for a second facemask 616 based on the travel alert 612. As further illustrated in the second stage 604, the updated recommendation 230 further includes a purchase option associated with the first facemask 614 and the second facemask 616, e.g., the "add to cart" buttons 618a, 618b. Accordingly, the techniques described herein enable ongoing monitoring of the destination 204 to generate updated recommendations 230 for a user based on developing situations and conditions.

As shown in the second stage 604, the updated recommendation 230 also includes options 620a, 620b to "preview" the first facemask 614 and the second facemask 616. Accordingly, at the third stage 606, the monitoring system 124 is operable to generate synthetic digital content 224 that depicts an individual with the good and/or service at the destination 204. For instance, a first image 622 depicts Ellie in Seattle wearing the first facemask 614, while a second image 624 depicts Ellie in Seattle wearing the second facemask 616. In this way, the techniques described herein enable a user to compare different recommended goods and/or services in an efficient and intuitive manner via digital content that depicts the user at the destination 204 in which the goods and/or services will be utilized.

Figure 7:
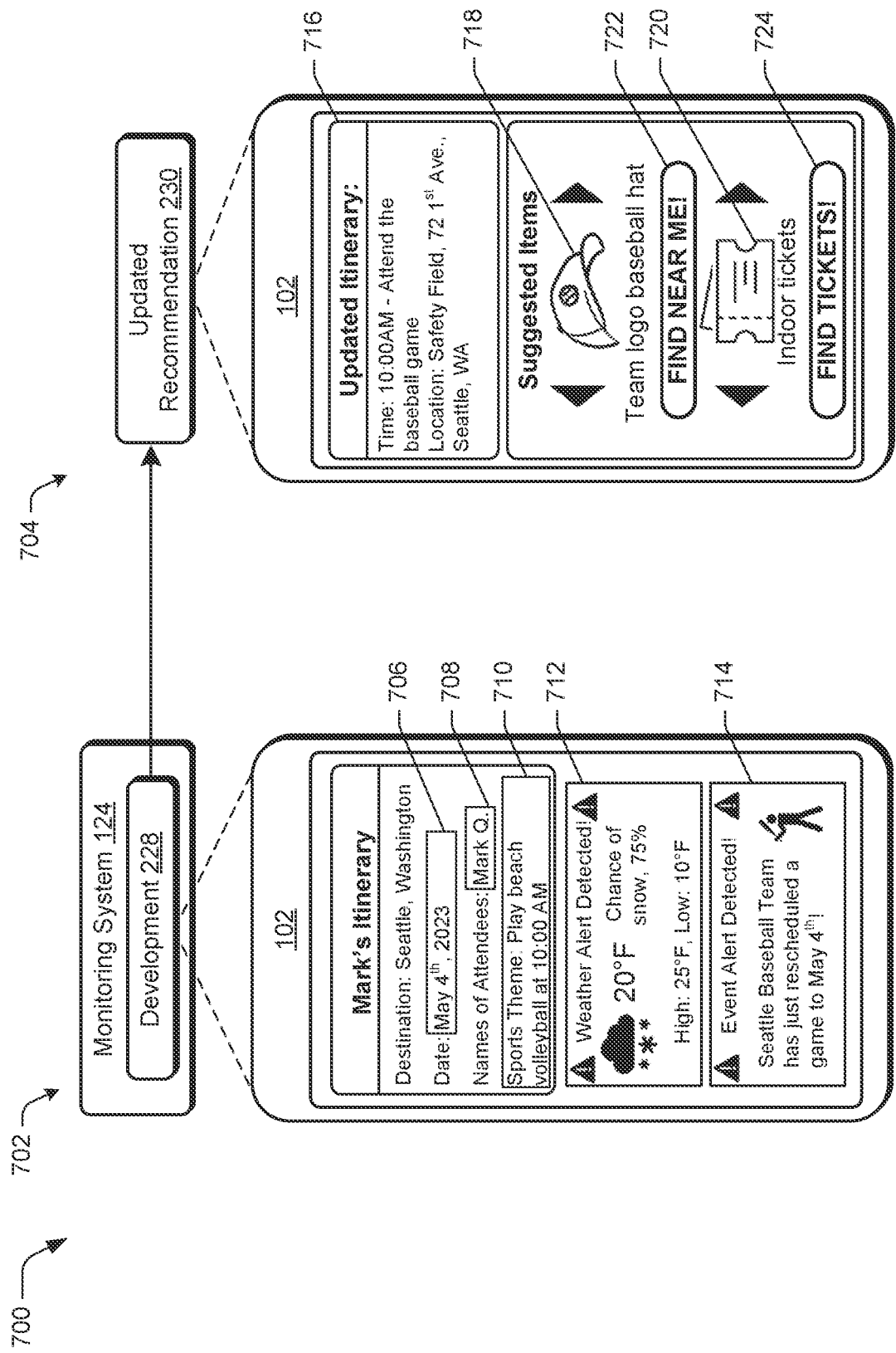
FIG. 7 depicts an example implementation for personalized product recommendations based on an itinerary depicting further operation of a monitoring system in accordance with one or more implementations.

FIG. 7 depicts an example implementation 700 for personalized product recommendations based on an itinerary depicting further operation of the monitoring system in accordance with one or more implementations. In this example, shown in first stage 702 and second stage 704, the monitoring system 124 is operable to receive an itinerary 208 as input that includes a destination 204, which in this example is Seattle, Washington. The itinerary further includes additional parameters 210, such as a date 706 (e.g., May 4, 2023), a name 708 of the individual that will be visiting the destination 204, in this example "Mark Q" and an event 710 in accordance with a specified theme, e.g., a "sports" theme, for Mark to play beach volleyball at 10:00 AM.

In this example, the monitoring system 124 is employed to detect a development 228 related to Seattle, e.g., a weather alert 712 indicating that Seattle is anticipating snow and cold weather on May the $4^{th}$. Accordingly, it would be unpleasant to play beach volleyball in the snow and cold weather. The monitoring system 124 is further employed to detect a second development 228 related to Seattle, such as an event alert 714 that indicates that a baseball game has just been rescheduled to May $4^{th}$. As shown in second stage 704, the monitoring system 124 is operable to generate an updated recommendation 230, for instance using similar techniques that are employed to generate the recommendation 206.

In this example, the updated recommendation 230 includes an updated itinerary 716, e.g., that suggests attending the baseball game as well as a location of the stadium. The updated recommendation 230 is generated based on the weather alert and a determination that the baseball stadium has indoor seating, as well as a user preference that indicates that Mark is interested in sports, and thus the event corresponds with Mark's interests. The updated recommendation 230 is further based on the theme, in this example a "sports" theme. The updated recommendation 230 further includes a recommendation for a baseball hat 718 with the team's logo, as well as for tickets 720 to the game. As further illustrated in the second stage 704, the updated recommendation 230 includes a purchase option associated with the baseball hat 718, e.g., the "Find near me!" button 722. The updated recommendation 230 also includes a purchase option associated with the tickets 720, e.g., the "Find Tickets!" button 724. Accordingly, the techniques described herein support dynamic recommendations for a user along with corresponding product recommendations by monitoring a variety of developments associated with the destination 204.

Figure 8:
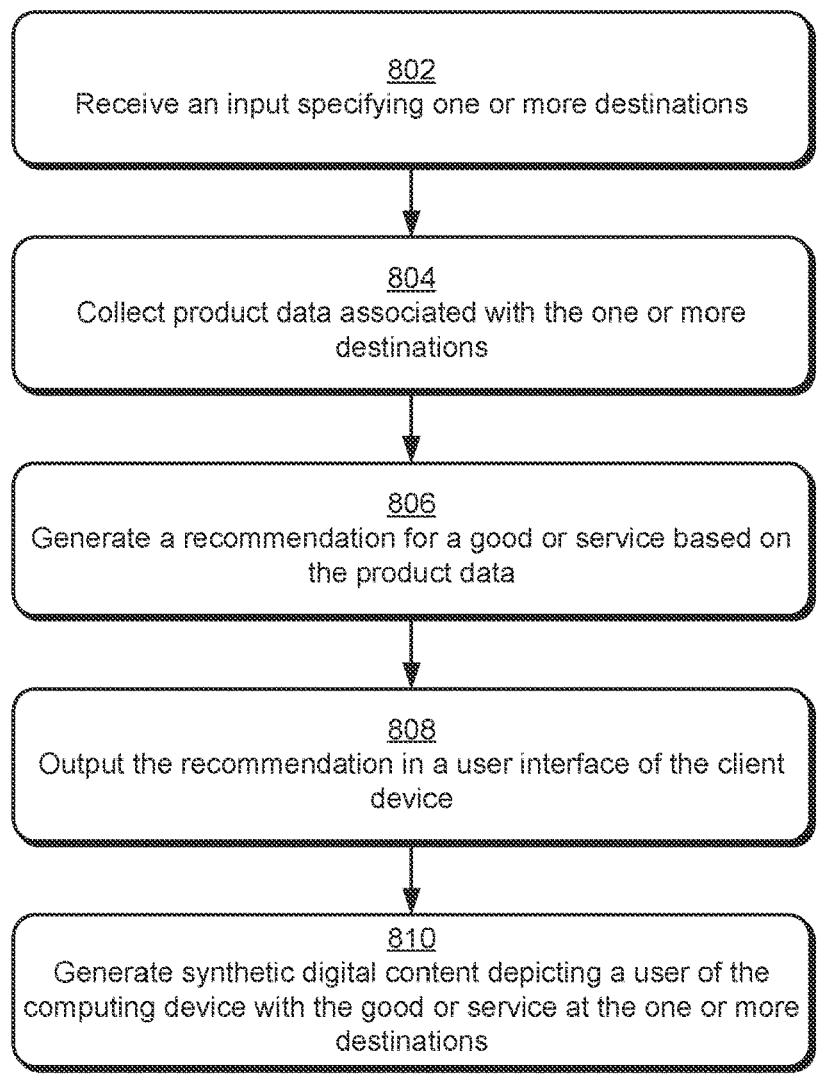
FIG. 8 illustrates a flow chart depicting an example method for personalized product recommendations based on an itinerary in accordance with one or more implementations.

FIG. 8 illustrates a flow chart depicting an example method 800 for personalized product recommendations based on an itinerary in accordance with one or more implementations. At 802, an input including a destination is received. For instance, the destination 204 is included as part of an itinerary 208 such as a travel itinerary that specifies one or more destinations 204 for a user of a client device 102 to visit. The destination 204 can be a geographical area (e.g., a country, state, city, etc.), a sight (e.g., a monument, attraction, viewpoint, vista, etc.), an address, GPS coordinates (a "geolocation"), etc. The input 202 and the itinerary 208 can include additional criteria such as parameters 210 that are usable in generating the recommendation 206. For instance, the parameters 210 include one or more of a search radius around the destination 204, a time range such as times of the day and/or days of the week/month/year, user preferences (e.g., style preferences), one or more themes, digital content albums that depict the user at the destination 204, or a selection of particular individuals to visit the destination 204.

At 804, product data associated with the one or more destinations is collected. The product data 218 can include digital content (e.g., photos, videos, augmented reality/virtual reality ("AR/VR") content, etc.) that depicts the destination 204 and includes representations of goods and/or services. For instance, the digital content depicts goods such as clothing items, accessories, food, drinks, equipment, convenience products, vehicles, etc. The digital content can also depict various services, such as activities associated with the destination 204, sporting/music/arts events, a tour guide service, various restaurants, classes and/or lessons (e.g., a cooking class), a spa and/or resort, etc. The product data 218 can further include various text inputs, e.g., that describe the goods and/or services in relation to the destination 204. The product data 218 is collectible in a variety of ways, and in one example the product data 218 is collected using one or more web-scraping and/or web-crawling techniques, e.g., from one or more social media platforms, websites, databases, etc.

At 806, a recommendation for a good or service based on the product data is generated. Generally, the recommendation 206 represents a "desirable" good and/or service for the user. In various examples, generating the recommendation 206 includes identifying goods and/or services depicted by the product data 218. The recommendation 206 can also be based in part or in whole on product reviews for the good and/or service, social media statistics (e.g., a number of "likes" and/or "shares") associated with the product data, AI-based content scoring algorithms, machine learning based image popularity assessments, etc. In one or more examples, the recommendation 206 is based on a product recommendation score based on a variety of factors such as a correspondence of goods and/or services to the user, social media statistics associated with goods and/or services, a "rating" of the goods and/or services such as a product rating score, etc.

At 808, the recommendation is output in a user interface of the client device. In an example, the recommendation includes a purchasing option to acquire the good and/or service, e.g., for a visit to the destination 204. For instance, the recommendation 206 can include a link to acquire the good and/or service from a third-party platform, directions to acquire the good and/or service, a geolocation, instructions, contact information, etc. for the user to acquire the recommended good and/or service. In some implementations, the recommendation 206 includes more than one recommended good and/or service, and the recommendation 206 is configured as a list, e.g., a shopping list.

At 810, an instance of synthetic digital content depicting a user with the good or service at the destination is generated. In some embodiments, the recommendation 206 includes a representation of the synthetic digital content 224. The synthetic digital content 224 incorporates a representation of the user into one or more scenes that depict the destination 204 and further incorporates the recommended good and/or service into the representation of the user. In some examples, the synthetic digital content 224 is generated using an artificial intelligence ("AI") based segmentation algorithm, e.g., based on digital content that depicts the user, digital content that depicts the destination 204, and digital content that depicts the good and/or service. The synthetic digital content 224 can also be edited to add/remove visual effects and/or features. In this way, the synthetic digital content 224 is generated in a photorealistic manner and enables visualization of how the user will look at a destination 204 with a recommended good and/or service.

Figure 9:
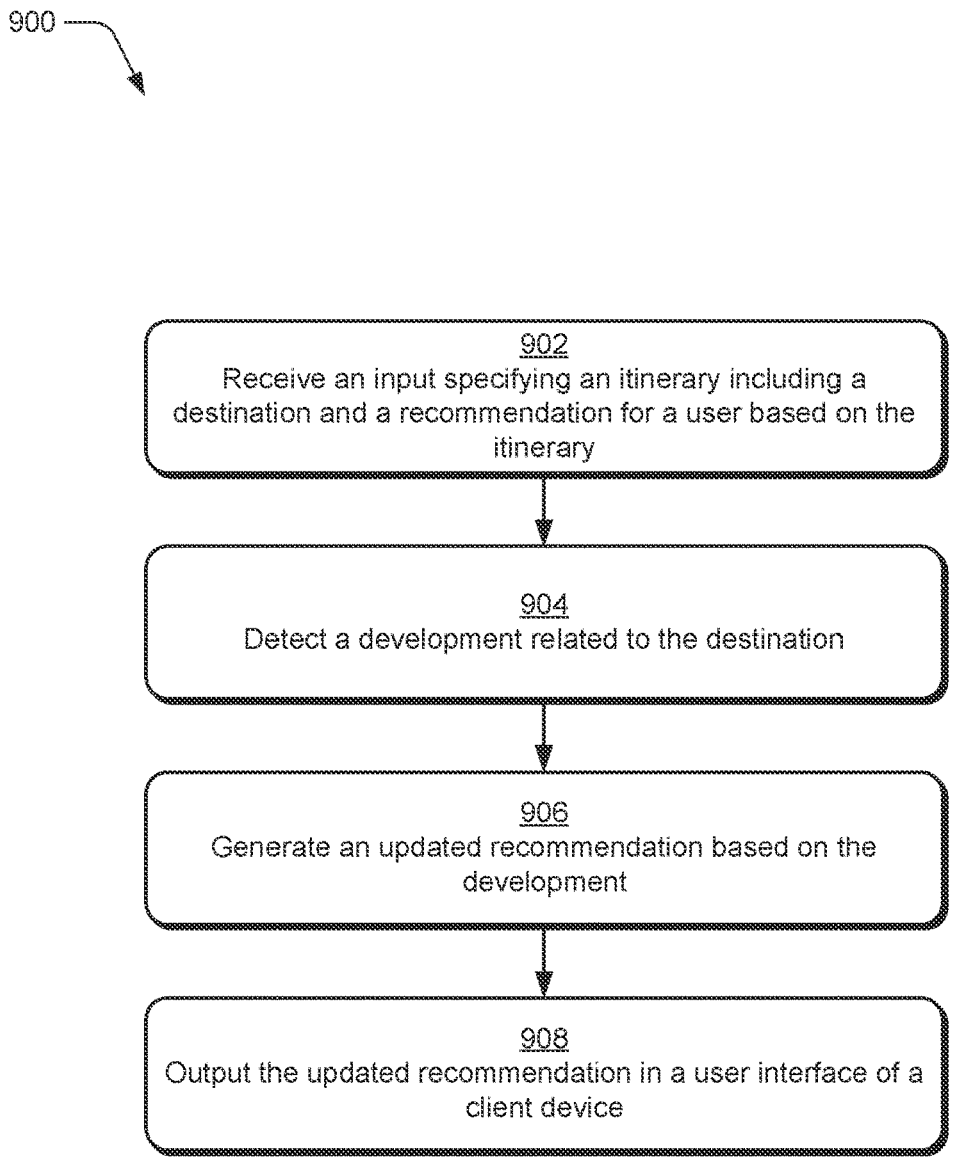
FIG. 9 illustrates a flow chart depicting an example method for personalized product recommendations based on an itinerary including operation of a monitoring system in accordance with one or more implementations.

FIG. 9 illustrates a flow chart depicting an example method 900 for personalized product recommendations based on an itinerary including operation of a monitoring system in accordance with one or more implementations. At 902, an input specifying an itinerary including a destination is received. In some examples, the input further includes a recommendation for a user based on the itinerary 208, e.g., a recommendation 206 as described above.

At 904, a development related to the destination is detected. Generally, the development 228 describes a change to the itinerary 208 and/or variable conditions that impact the recommendation 206. Developments 228 can include a variety of scenarios, such as a weather update, an addition/cancellation/change to an event, a local directive particular to the destination 204, a change in local style/fashion, a recent discount for one or more goods and/or services, a developing geopolitical situation, construction/renovation events, a regional health mandate, a natural disaster or occurrence, etc. The development 228 can be detected in a variety of ways such as via a query to a travel advisory system, through one or more applications of the client device 102 (e.g., a weather application, an event application, reservation application, etc.), using web-scraping operations, etc.

At 906, an updated recommendation based on the development is generated. In an example, the updated recommendation 230 pertains to a good and/or service, e.g., a different good and/or service than was included in the recommendation 206. In another example, the updated recommendation 230 includes a change to the itinerary 208, e.g., to avoid the destination 204, to include a different destination to the itinerary 208, or to adjust the time/date to visit the destination 204. In further examples, the updated recommendation 230 includes a suggested location to capture digital content, settings that are recommended to obtain a content capture based on the development 228, a suggestion to adjust one or more other parameters 210 associated with the itinerary 208, etc.

At 908, the updated recommendation is output in a user interface of a client device. In various examples, the updated recommendation 230 can include one or more of a purchasing option to acquire a different good and/or service, a link to acquire the good and/or service from a third-party platform, directions to acquire the good and/or service, a geolocation, instructions, contact information, etc. for the user to acquire the recommended good and/or service. In some implementations, the updated recommendation 230 includes more than one recommended good and/or service, and the updated recommendation 230 is configured as a list, e.g., a shopping list. The updated recommendation 230 can further be configured to include synthetic digital content 224 as described above, and thus provide a visual example that depicts the user with the good and/or service included in the updated recommendation 230 at the destination 204.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
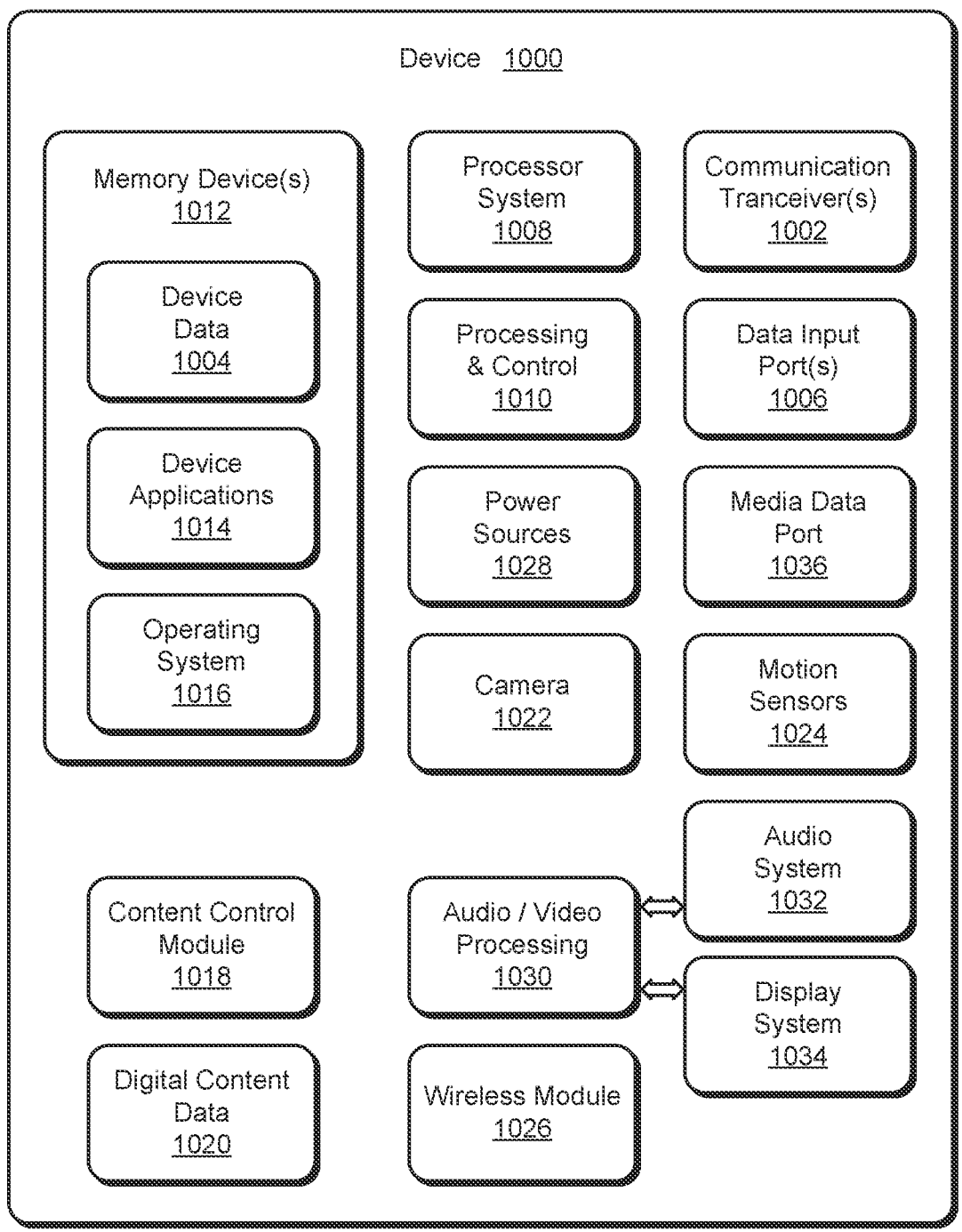
FIG. 10 illustrates various components of an example device in which aspects of personalized product recommendations based on an itinerary can be implemented.

FIG. 10 illustrates various components of an example device 1000 in which aspects of personalized product recommendations based on an itinerary can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the client device 102 as shown and described with reference to FIGS. 1-9 may be implemented as the example device 1000.

The device 1000 includes communication transceivers 1002 that enable wired and/or wireless communication of device data 1004 with other devices. The device data 1004 can include any of device identifying data, device location data, wireless connectivity data, and wireless protocol data. Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a content control module 1018 that implements aspects of personalized product recommendations based on an itinerary and may be implemented with hardware components and/or in software as one of the device applications 1014. In an example, the content control module 1018 can be implemented as the content control module 116 described in detail above. In implementations, the content control module 1018 may include independent processing, memory, and logic components as a computing and/or electronic device integrated with the device 1000. The device 1000 also includes digital content data 1020 for implementing aspects of personalized product recommendations based on an itinerary and may include data from and/or utilized by the content control module 1018.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the client device 102, the wireless module 1026 can be leveraged to scan for and detect wireless networks, as well as negotiate wireless connectivity to wireless networks for the client device 102. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of personalized product recommendations based on an itinerary have been described in language specific to features and/or methods, the subject of the appended claims is not necessarily limited to the specific features or methods described. Rather, the features and methods are disclosed as example implementations of personalized product recommendations based on an itinerary, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a content control module implemented at least partially in hardware and configured to: receive an input specifying an itinerary including a destination and a recommendation for a user based on the itinerary; detect a development related to the destination; generate an updated recommendation based on the development; and output the updated recommendation in a user interface of the computing device.

In some aspects, the techniques described herein relate to a computing device, wherein the development includes one or more of a weather update, a change to a detected event included on the itinerary, or a local directive particular to the destination.

In some aspects, the techniques described herein relate to a computing device, wherein the recommendation is for a particular content capture at the destination, and wherein the updated recommendation includes a suggestion for a different site for the user to obtain a content capture.

In some aspects, the techniques described herein relate to a computing device, wherein the updated recommendation includes updated device configuration settings to obtain the content capture based on the development.

In some aspects, the techniques described herein relate to a computing device, wherein the recommendation is for a good or service, and wherein the updated recommendation is for a different good or service and includes a purchasing option to acquire the different good or service.

In some aspects, the techniques described herein relate to a computing device, wherein the recommendation includes digital content depicting the user at the destination, and wherein the updated recommendation includes an updated instance of digital content depicting the user with the different good or service at the destination.

In some aspects, the techniques described herein relate to a computing device, wherein the development is detected in part by querying a travel advisory system.

In some aspects, the techniques described herein relate to a computing device, wherein the development is detected in part through one or more weather applications of the computing device.

In some aspects, the techniques described herein relate to a method, including: receiving an input specifying an itinerary including a destination and a recommendation for a user based on the itinerary; detecting a development related to the destination; generating an updated recommendation based on the development; and communicating the updated recommendation to the user.

In some aspects, the techniques described herein relate to a method, wherein the development includes one or more of a weather event, a natural disaster, or a local directive particular to the destination.

In some aspects, the techniques described herein relate to a method, wherein the recommendation is for a particular content capture at the destination, and wherein the updated recommendation includes a suggestion for a different site for the user to obtain a content capture.

In some aspects, the techniques described herein relate to a method, wherein the recommendation is for a good or service, and wherein the updated recommendation is for a different good or service and includes a purchasing option to acquire the different good or service.

In some aspects, the techniques described herein relate to a method, wherein the updated recommendation includes a promotion related to the different good or service.

In some aspects, the techniques described herein relate to a method, wherein the itinerary includes digital content depicting the user at the destination, and wherein the updated recommendation includes an updated instance of digital content depicting the user with the different good or service at the destination.

In some aspects, the techniques described herein relate to a method, wherein the development is detected in part utilizing web scraping techniques to collect information from one or more social media platforms.

In some aspects, the techniques described herein relate to a method, wherein the development includes a regional health mandate, and the updated recommendation includes a suggestion to obtain a good or service related to the regional health mandate.

In some aspects, the techniques described herein relate to a system including: a network; and a computing device communicatively coupled to the network, the computing device to perform operations including: receiving, via the network, an input specifying an itinerary including one or more destinations and a product recommendation for a user based on the itinerary; detecting, via the network, a development related to the one or more destinations; generating an updated product recommendation for the user based on the development; and output the updated product recommendation with a purchasing option to acquire a good or service in a user interface of the computing device.

In some aspects, the techniques described herein relate to a system, wherein the development includes a weather event, and the updated product recommendation includes a shopping list based on the weather event.

In some aspects, the techniques described herein relate to a system, wherein the development includes an outbreak of an illness, and the updated product recommendation includes a suggestion to obtain a medical good or service based on the outbreak.

In some aspects, the techniques described herein relate to a system, wherein the development includes an announcement of an event at the one or more destinations, and the updated product recommendation includes a good or service related to the event.

The invention claimed is:

1. A computing device, comprising:
at least one memory; and
at least one processor coupled to the at least one memory and configured to cause the computing device to:
receive an input that includes a destination and a recommendation for a good or service for a user based on the destination;
detect, by an application of the computing device, a development that includes a variable condition related to the destination that impacts the recommended good or service;
generate, responsive to detection of the development by the application, an updated recommendation based on the development that includes an updated good or service;

generate synthetic digital content that depicts the user with the updated good or service at the destination with the variable condition including adjusting a visual property of the synthetic digital content based on the development by applying a visual edit including one or more of a shadow, filter, or blending effect to the synthetic digital content; and output the updated recommendation by causing display of the synthetic digital content with the adjusted visual property in a user interface of the computing device.

2. The computing device of claim 1, wherein the development includes one or more of a weather update, a change to an event, or a local directive particular to the destination.

3. The computing device of claim 1, wherein the development is detected in part by querying a travel advisory system.

4. The computing device of claim 1, wherein the development is detected in part through one or more weather applications of the computing device.

5. The computing device of claim 1, wherein adjusting the one or more visual properties includes adjusting a sizing, location, positioning, contrast, exposure, lighting, or resolution of one or more portions of the synthetic digital content.

6. The computing device of claim 1, wherein the input further includes digital content that depicts the user, and the computing device is further configured to extrapolate one or more user preferences based on processing of the digital content by a clothing image detection model configured to identify goods or services within instances of digital content.

7. The computing device of claim 6, the computing device further configured to collect product data that includes digital images associated with the destination;
filter the digital images of the product data based on the one or more user preferences generated by the clothing image detection model; and
generate the synthetic digital content by processing the digital content that depicts the user and the filtered digital images of the product data.

8. The computing device of claim 6, wherein the synthetic digital content includes an album based on the one or more extrapolated user preferences and one or more themes.

9. A method performed by a client device, the method comprising:
receiving, at the client device, an input that includes a destination and a recommendation for a good or service for a user based on the destination;
detecting, by an application of the client device, a development that includes a variable condition related to the destination that impacts the good or service;
generating, responsive to the detection of the development by the application, an updated recommendation based on the development that includes an updated good or service;
generating synthetic digital content that depicts the user with the updated good or service at the destination with the variable condition, the generating including adjusting a visual property of the synthetic digital content based on the development by applying a visual edit including one or more a shadow, filter, or blending effect to the synthetic digital content; and
outputting the updated recommendation including displaying the synthetic digital content with the adjusted visual property in a user interface of the client device.

10. The method of claim 9, wherein the development includes one or more of a weather event, a natural disaster, or a local directive particular to the destination.

11. The method of claim 9, wherein the development is detected in part utilizing web scraping techniques to collect information from one or more social media platforms.

12. The method of claim 9, wherein the development includes a regional health mandate, and the updated recommendation includes a suggestion to obtain a good or service related to the regional health mandate.

13. The method of claim 9, the generating the synthetic digital content including:
receiving, by the client device, digital content that depicts the user, digital content that depicts the destination, and digital content that depicts the good or service;
processing, by the client device, the digital content that depicts the user, the digital content that depicts the destination, and the digital content that depicts the good or service to generate the synthetic digital content; and
applying the visual edit to the synthetic digital content based on the development.

14. The method of claim 9, the displaying the synthetic digital content including displaying a first instance of synthetic digital content that depicts the user with the updated good or service at the destination with the variable condition and a second instance of digital content that depicts the user with an additional updated good or service at the destination with the variable condition in the user interface of the client device.

15. The method of claim 9, wherein the visual edit includes a lighting effect applied to the synthetic digital content.

16. A system comprising:
a network; and
a computing device communicatively coupled to the network, the computing device configured to perform operations comprising:
receiving, via the network, an input that includes a destination and a product recommendation for a user based on the destination;
detecting, by an application of the computing device, a development that includes a variable condition related to the destination that impacts the product recommendation;
generating, responsive to detection of the development by the application, an updated product recommendation for the user based on the development;
generating synthetic digital content that depicts a user of the computing device with the updated product recommendation at the destination with the variable condition including adjusting a visual property of the synthetic digital content based on the development by applying a visual edit including one or more of a shadow, filter, or blending effect to the synthetic digital content; and
output the updated product recommendation by causing display of the synthetic digital content with the adjusted visual property in a user interface of the computing device.

17. The system of claim 16, wherein the development includes a weather event, and the updated product recommendation includes a shopping list based on the weather event.

18. The system of claim 16, wherein the development includes an outbreak of an illness, and the updated product recommendation includes a suggestion to obtain a medical good or service based on the outbreak.

19. The system of claim 16, wherein the development includes an announcement of an event at the destination, and the updated product recommendation includes a good or service related to the event.

20. The system of claim 16, wherein the visual property includes a visual effect based on a relative intensity and location of a light source within the synthetic digital content.

* * * * *